United States Patent [19]

Baron

[11] 4,088,024

[45] May 9, 1978

[54] COMBINATION MICROWAVE-THERMAL OVEN THERMOSTAT

[75] Inventor: David Alan Baron, Edina, Minn.

[73] Assignee: Litton Systems, Inc., Beverly Hills, Calif.

[21] Appl. No.: 686,999

[22] Filed: May 17, 1976

[51] Int. Cl.² .............................................. G01K 5/32
[52] U.S. Cl. .................................... 73/343 R; 73/368; 219/10.55 R
[58] Field of Search ................... 73/343 R, 368, 368.2; 219/10.55 E, 10.55 M

[56] References Cited

U.S. PATENT DOCUMENTS

| | | | |
|---|---|---|---|
| 2,920,174 | 1/1960 | Haagensen | 219/10.55 E |
| 3,081,392 | 3/1963 | Warner | 219/10.55 E |
| 3,096,691 | 7/1963 | Salmon | 73/368 X |
| 3,177,335 | 4/1965 | Fitzmayer | 219/10.55 |
| 3,400,886 | 9/1968 | Holtkamp | 73/368 X |
| 3,742,179 | 6/1973 | Harnden, Jr. | 73/343 R X |
| 3,774,441 | 11/1973 | Dorst, et al. | 73/343 R X |
| 3,812,719 | 5/1974 | Shopsny | 73/368 |
| 3,913,058 | 10/1975 | Nishio, et al. | 73/343 R X |
| 3,920,944 | 11/1975 | Constable | 219/10.55 M |
| 3,950,632 | 4/1976 | Rivelli | 73/343 R X |

Primary Examiner—S. Clement Swisher
Attorney, Agent, or Firm—Robert E. Lowe

[57] ABSTRACT

A thermostat adapted for use in a combination microwave/thermal oven is disclosed wherein at least the outer surface of the thermostat bulb is an electrically conductive metal of the type that is either oxidation resistant or which forms a metal oxide which has a low loss tangent at the microwave frequency employed in the oven.

13 Claims, 2 Drawing Figures

COMBINATION MICROWAVE-THERMAL OVEN THERMOSTAT

BACKGROUND OF THE INVENTION

This invention relates to the field of cooking ranges which include an oven cavity configured to carry out both conventional thermal cooking and microwave cooking, or both methods of cooking simultaneously. Such ranges and ovens present a variety of design and construction problems brought about by areas of incompatability between thermal cooking devices and microwave cooking devices.

Thermal cooking is traditionally controlled by controlling the variables of temperature and time. Microwave cooking, until recently, was controlled through the variable of time only. More recent microwave ovens permit the microwave power level to be varied as well. The control of oven temperature remains a critical variable in both thermal cooking and in combination cooking. The term "combination cooking" is intended to mean the cooking of food through the simultaneous application of both thermal and microwave energy.

In thermal ovens and ranges temperature is traditionally controlled through a thermostat which includes a bulb portion located in the oven cavity for sensing the temperature in the cavity and providing a control signal in response to the sensed temperature. The customary practice in the industry has been to manufacture the thermostat bulb outer casing from steel, which has the advantages of high melting point, workability, and durability.

When a steel thermostat bulb is subjected to the hot, moist atmosphere in an oven a coating of iron oxides form on the steel. This oxidation process has not been of particular significance in thermal ranges heretofore, but causes highly undesirable effects in combination cooking ranges.

The iron oxides formed on the conventional steel bulb have a relatively high loss tangent at microwave frequencies, causing the bulb to be heated to a significant degree when exposed to microwave energy. This effect in combination cooking causes the thermostat to be highly inaccurate or inoperable as the presence of microwave energy in the cavity causes a distorted thermostatic signal because of the induced heating of the thermostat bulb.

Prior efforts to solve the problem have been primarily directed to isolating the thermostat bulb from the microwave energy through the use of RF screens of various types, which techniques involve additional manufacturing steps and materials and may interfere with the thermal accuracy of the bulb.

SUMMARY OF THE INVENTION

It is accordingly an object of the present invention to provide a thermostat bulb for combination cooking which bulb will remain accurate in a microwave environment.

A further object of the invention is to provide a thermostat bulb for use in combination cooking wherein the bulb is of a material or coated with a material which experiences little induced heating in a microwave environment.

Other objects and advantages of the present invention will become obvious as the description of the invention proceeds.

The present invention provides a thermostat bulb for use in a combination cooking environment wherein the bulb will remain relatively unaffected by microwave frequency energy. The bulb is provided with an outer skin or surface portion of an electrically conductive metal of the type which is either oxidation resistant or which forms an oxide having a low loss tangent at microwave frequencies.

DESCRIPTION OF PREFERRED EMBODIMENTS

The invention will be more particularly described, especially with regard to certain preferred embodiments thereof, by reference to the drawings.

Figure 1:
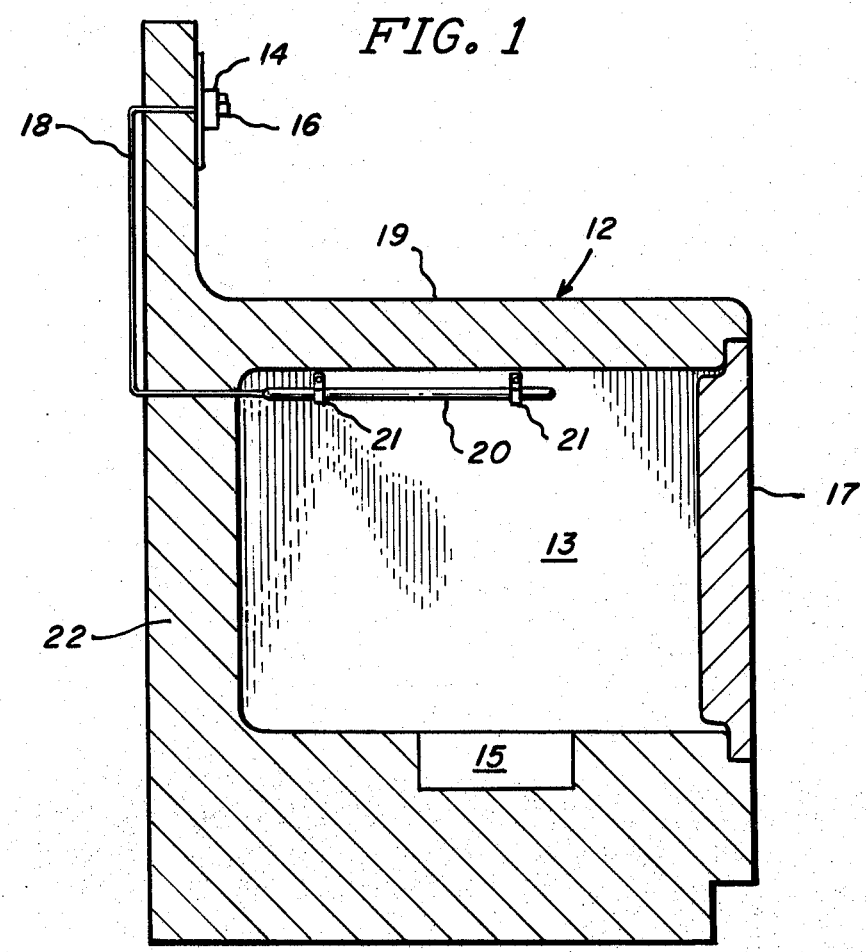
FIG. 1 is a partially schematic side view in cross-section of a typical cooking range showing the installation of the thermostat and bulb of the invention.

FIG. 1 depicts a cooking range 12 of generally standard configuration and including a frame 22, a range top 19, a door 17, and an oven 13. Heat is supplied in oven 13 in a conventional manner such as by electrical resistance elements or by gas. Microwave energy is also supplied to oven 13 from a source shown schematically at 15. The range 12 is of the type wherein thermal heating and microwave heating can be provided simultaneously in oven 13. Cooking performed by such simultaneous use of thermal and microwave energy is termed herein "combination cooking".

The temperature within oven 13 can be controlled by means of a thermostat which includes a bulb portion 20, capillary tube 18, control portion 14, and knob 16. Any desired oven cooking temperature may be selected by rotating knob 16 which causes the activation of the control portion 14 in a conventional manner. The temperature within oven 13 is sensed by bulb 20 which is fastened in the upper portion of the oven by means of clips 21, and the temperature signal is transmitted to control portion 14 by means of capillary tube 18.

Figure 2:
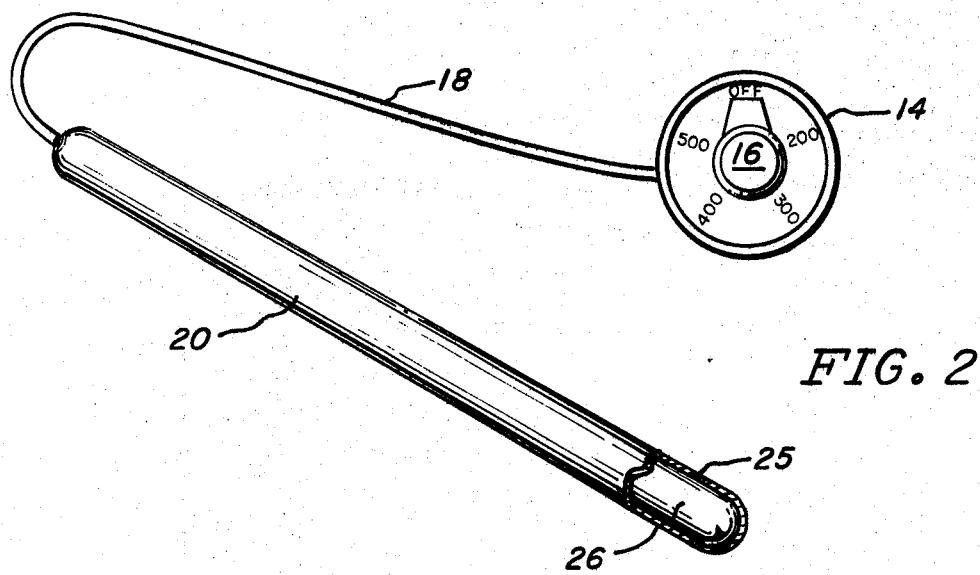
FIG. 2 is an enlarged perspective view of the thermostat bulb, partially cut away, and the controls connected therewith.

The thermostat bulb 20 is shown in an enlarged partial cut-away form in FIG. 2. As there shown, the bulb 20 comprises an inner portion 26 surrounded by an outer surface portion 25. As will be described in more detail hereinafter, in some cases inner portion 26 and surface portion 25 will be of dissimilar materials, whereas in other cases these portions will be of the same material. In the latter case, bulb 20 may be of one homogeneous mass rather than in distinct layers as depicted in FIG. 2. However, in such cases the theory of operation and operating characteristics remain the same.

It has been found that in order to allow the thermostat bulb 20 to function properly under conditions of combination cooking, at least the outer surface 25 must be made up of an electrically conductive metal which either is resistant to the formation of metal oxides in air, or which forms a metal oxide in air which has a low loss tangent characteristic at the microwave frequencies generally employed in cooking, i.e. 915MHz and 2450MHz. Materials such as steel which are commonly used in conventional thermal oven thermostats have been found to be unsatisfactory for use in a combination cooking environment because of the formation of a surface film of metal oxides having a high loss tangent. This phenomenon results in high induced temperatures from the I²R losses in the film when exposed to microwave energy.

As microwave cooking frequencies are fairly high frequencies compared to ordinary household line current, for example 2,450,000,000Hz compared to 60Hz, the surface portion 25 can be quite thin, on the order of micro-inches. Theoretically, at higher frequencies electrical conduction tends to take place largely on the surface of the conductor. The depth into a conductor in which substantially all conduction takes place at high frequency is referred to as skin depth and is represented by the Greek letter delta ($\delta$). The skin depth of a given conductive material at a given energy frequency can be calculated from the relationship:

$$\delta = \sqrt{\frac{\lambda \rho}{\pi \mu c}}$$

wherein:

$\delta$ = skin depth in meters
$\lambda$ = wavelength of the energy in meters
$\rho$ = resistivity of the material in ohm-meters
$\mu$ = permeability of space (4 × 10⁻⁷ henrys/meter)
$c$ = speed of light in meters per second.

A calculation performed using the above relationship wherein the selected material is aluminum having a resistivity of 2.825 × 10⁻⁸ ohm-meters exposed to microwave energy at 2450MHz having a wavelength of 0.1223 meters yields a skin depth $\delta$ of 1.7 × 10⁻⁶ meters or 6.7 × 10⁻⁵ inches. Thus it can be seen that under these conditions, substantially all of the conduction through aluminum takes place in the outer 67 micro-inches.

In the present invention it is considered preferable if the surface portion 25 have a depth at least equal to the skin depth $\delta$ of the material selected at the microwave frequency encountered. When the thickness of the surface portion 25 is at least equal to the skin depth for that material, and when the material is substantially oxidation resistant or forms a metal oxide having a low loss tangent, large I²R losses in the surface portion of the bulb are avoided. In this way heating of the bulb due to the currents set up by the microwave energy is minimized. Accordingly, the bulb is heated thermally only and provides an accurate measurement of oven temperature without interference from the microwave energy present.

It is of course necessary to choose a material for surface portion 25 that can withstand the temperatures encountered in operation of the oven 13, including those commonly experienced during pyrolytic cleaning cycles. For this reason, the material selected should have a melting point in excess of 1000° F and preferably in excess of 1200° F.

Various materials can be used in the practice of the present invention. For example, gold, platinum, rhodium and chromium are all substantially resistant to oxidation in air and can be plated onto other less expensive metals with relative ease. Various alloys are also oxidation resistant to a high degree, including commonly available materials such as stainless steel and nickel-chromium alloys.

Aluminum is well suited for use in the present invention as it forms an aluminum oxide film in air, which oxide exhibits a very low loss tangent at microwave frequencies. In addition, aluminum is relatively inexpensive and can be applied as an outer coating to other metals in a variety of ways such as plating, aluminizing, and in the form of aluminum paint. Inasmuch as the electrical skin depth $\delta$ of aluminum is on the order of 67 micro-inches at a frequency of 2450MHz, the thickness of an aluminum paint coating is sufficient to yield satisfactory results.

In some applications, it may be desirable to manufacture the bulb portion 20 from the material desired for the surface portion 25. For example, bulb portion 20 may be made of stainless steel thereby obviating the need for any additional surface coating or plating. In such cases, surface portion 25 and inner portion 26 will be of the same material and the bulb 20 will be of one homogeneous mass rather than in layers 26 and 25 as shown. In such cases, the theory of operation remains the same as the significant factor is the make-up of the surface of the bulb rather than the material present below the electrical skin depth.

While the foregoing specification describes the invention in considerable detail with regard to the selection of materials and the like, it will be understood that such detail is for the purpose of illustration and is not intended to limit the scope of the invention. Modifications can be made by those skilled in the art without departing from the spirit of the invention or its scope as defined in the appended claims.

I claim:

1. In a combination cooking oven of the type adapted to cook foods by the simultaneous application of thermal energy and microwave energy, and including a thermostatic control having a bulb element located in the oven for sensing and controlling the temperature therein, the improvement wherein said bulb element has a surface portion comprised of an electrically conductive, oxidation resistant metal having a melting point in excess of 1000° F.

2. The apparatus of claim 1 wherein said metal has a melting point in excess of 1200° F.

3. The apparatus of claim 1 wherein said metal is selected from the group consisting of gold, platinum, rhodium, chromium, nickel-chrome alloys, and stainless steel.

4. The apparatus of claim 1 wherein said surface portion has a thickness at least equal to the electrical skin depth of said metal wherein said skin depth is defined by the relationship:

$$\delta = \sqrt{\frac{\lambda \rho}{\pi \mu c}}$$

where $\delta$ is the skin depth, $\lambda$ is the wavelength of the primary frequency microwave energy, $\rho$ is the resistivity of said metal, $\mu$ is the permeability of free space, and $c$ is the speed of light.

5. In a combination oven of the type adapted to cook foods by the simultaneous application of thermal energy and microwave energy, and including a thermostatic control having a bulb element located in the oven for sensing and controlling the temperature therein, the improvement wherein said bulb element has a surface portion comprised of an electrically conductive metal having a melting point in excess of 1000° F and which forms a metal oxide having a low loss tangent.

6. The apparatus of claim 5 wherein said metal has a melting point in excess of 1200° F.

7. The apparatus of claim 5 wherein said metal is aluminum.

8. The apparatus of claim 7 wherein said metal is applied in the form of aluminum paint.

9. The apparatus of claim 5 wherein said surface portion has a thickness at least equal to the electrical skin depth of said metal wherein said skin depth is defined by the relationship:

$$\delta = \sqrt{\frac{\lambda \rho}{\pi \mu c}}$$

where $\delta$ is the skin depth of said metal, $\lambda$ is the wavelength of the primary frequency microwave energy, $\rho$ is the resistivity of said metal, $\mu$ is the permeability of free space, and $c$ is the speed of light.

10. In a combination cooking oven of the type adapted to cook foods by the simultaneous application of thermal energy and microwave energy, and including a thermostatic control having a bulb element located in the oven for sensing and controlling the temperature therein, the improvement wherein said bulb is made from an electrically conductive, oxidation resistant metal having a melting point in excess of 1000° F.

11. The apparatus of claim 10 wherein said metal is stainless steel.

12. The apparatus of claim 10 wherein said metal has a melting point in excess of 1200° F.

13. A cooking range comprising a frame including an oven having a door providing access to said oven, heating means for providing thermal energy to said oven, means providing microwave energy to said oven whereby foodstuffs may be cooked in said oven by the simultaneous application of thermal energy and microwave energy, thermostatic control means for controlling said heating means including a bulb element located in said oven, and wherein at least the outer surface of said bulb portion is made from an electrically conductive, oxidation resistant metal having a melting point in excess of 1200° F.

* * * * *